Feb. 22, 1966     H. A. FROMSON     3,235,954
METHOD OF PRODUCING A COMPOSITE STRUCTURE OR LAMINATE
Filed July 23, 1964     2 Sheets-Sheet 2

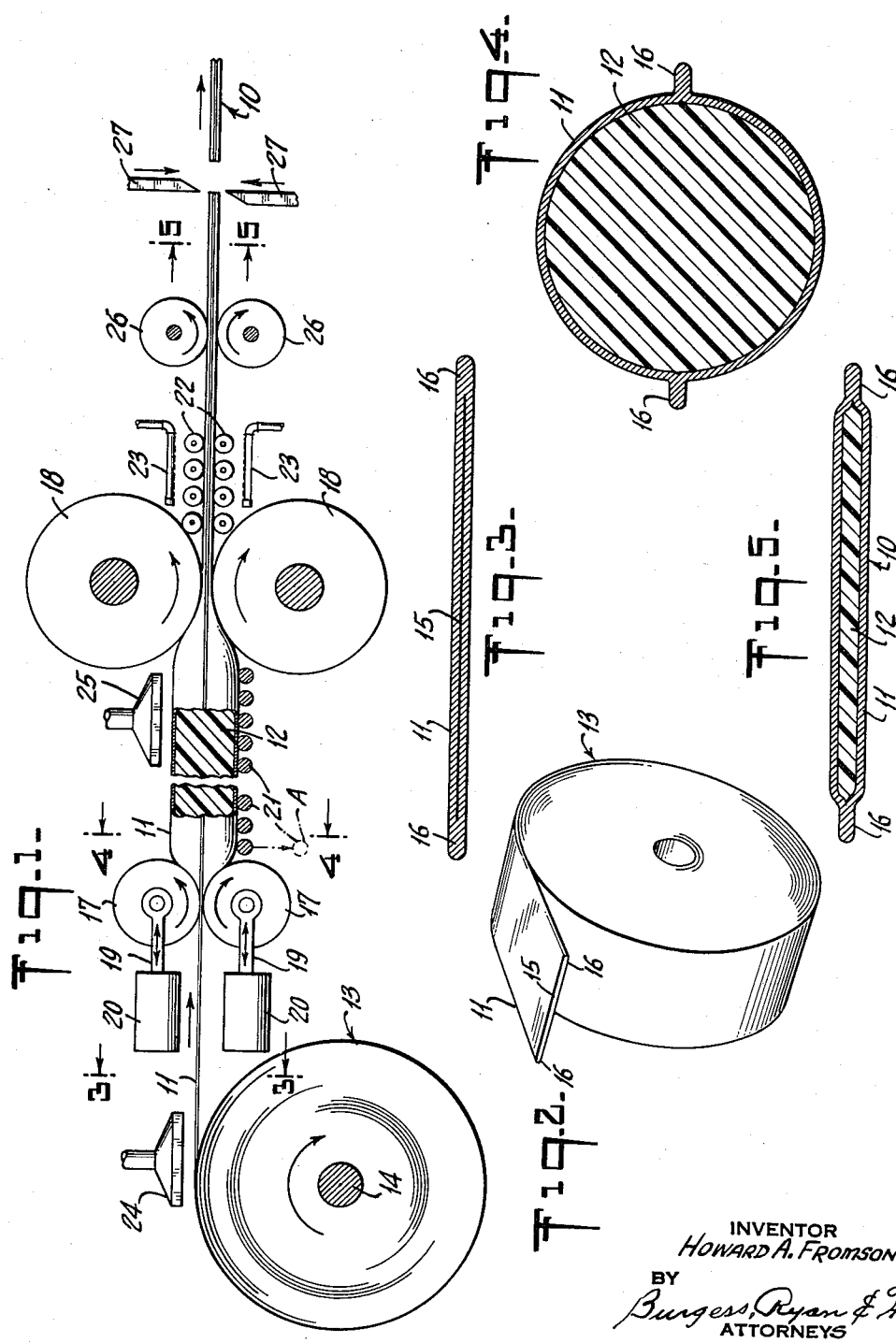

INVENTOR
HOWARD A. FROMSON
BY
Burgess, Ryan & Hicks
ATTORNEYS

United States Patent Office 3,235,954
Patented Feb. 22, 1966

3,235,954
METHOD OF PRODUCING A COMPOSITE
STRUCTURE OR LAMINATE
Howard A. Fromson, Rogues Ridge Road, Weston, Conn.
Filed July 23, 1964, Ser. No. 384,653
14 Claims. (Cl. 29—420)

The present invention relates to the production of laminates comprising a core enclosed within an outer casing, sheath or skin. The present application is a continuation-in-part of Serial No. 143,394 filed October 6, 1961, now abandoned.

An object of the present invention is to provide a method by which a composite structure or laminate having a core of one material enclosed within an outer casing, sheath or skin of a different material, can be produced inexpensively and in a continuous manner with the core completely filling the casing. As will appear from the following description, a wide variety of materials, including various plastics and metals, may be used for the core and the outer casing of a composite structure produced in accordance with the invention. For example, where the composite structure is to be used as a structural member, the outer casing may be made of a light gauge aluminum alloy and the core may be a plastic material which will impart rigidity and strength to the outer sheath of aluminum and which will also provide insulating properties.

Other objects and advantages of the invention will be apparent and will be better understood from the following description and the accompanying drawings, in which:

FIG. 1 is a schematic view illustrating one way of producing a composite structure or laminate in accordance with the present invention;

FIG. 2 is a perspective view of a roll of the material from which the casing or jacket of the composite structure is formed;

FIG. 3 is a section view taken along the line 3—3 of FIG. 1, but on an enlarged scale;

FIG. 4 is a section view taken along the line 4—4 of FIG. 1, but on an enlarged scale;

FIG. 5 is a section view taken along the line 5—5 of FIG. 1, but on an enlarged scale;

Figure 6:
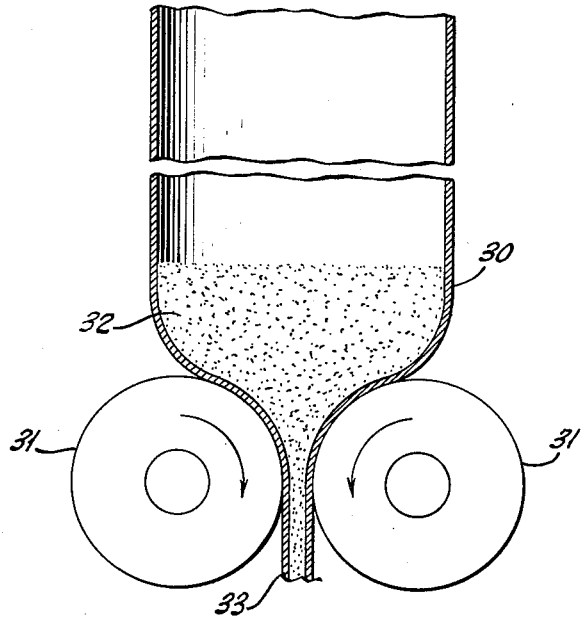
FIG. 6 shows in vertical section another way of producing a composite structure in accordance with the present invention.

It will be understood that the figures shown in the accompanying drawings are of a diagrammatic nature for illustrative purposes with reference to the following description and are not drawn to scale.

In the particular example illustrated and described herein, the composite structure or laminate 10 is produced in accordance with the present invention with an outer impervious casing or sheath 11 of an aluminum alloy, and a core 12 of a plastic material, such as polyethylene. However, it will be understood that the outer casing or sheath may be made of other suitable deformable materials, having form sustaining rigidity in its final form, including metal or alloys thereof, such as copper, aluminum, stainless steel, or it may be made from plastic materials. Similarly, the core may also be formed from various materials, including both thermoplastic and thermosetting plastic materials, cements, metals, metal alloys and powdered metals.

As shown in FIG. 5, the particular laminate described is a generally flat sheet or panel such as might be used for siding or other structural purposes, but it will be understood that composite structures suitable for other uses may be produced in accordance with the present invention and may have other shapes or configuration if desired.

In general, the production of a laminate structure in accordance with the present invention is carried out by filling an expanded portion of a long impervious tube constituting the outer casing with a supply of core-forming material in flowable condition, and passing the tube so filled through a forming and flattening die while the core-forming material is pressed forwardly against the field of action of the die, to assure complete filling of the flattened tube as it emerges forwardly from the forming die. The forming and flattening die desirably is such as to reduce the transverse cross-sectional area of the laminate structure, compared with the transverse cross-sectional area of the filled expanded portion of the tube. This assists in assuring the complete filling of the flattened tube with the core material and also serves to progressively spread the core material from the field of action of the forming dies rearwardly along the expanded portion of the tube as the laminate shaping operation continues.

In the procedure illustrated in FIG. 1 for forming a composite structure in accordance with the present invention, a roll or coil 13 of a flat, ribbon-like strip of metal tubing which is to form the outer casing or sheath 11 of the composite structure is wound on a shaft 14 so that the flat, ribbon-like strip of tubing may be continuously withdrawn from the coil as the composite structure is being produced.

The flat, ribbon-like strip of tubing has opposing interior surfaces which are unbonded and define a central fissure 15, as shown best in FIG. 3. Thus, the strip can be readily expanded into hollow or tubular form by introducing a fluid under pressure, a mandrel or the like into the central fissure and forcing the unbonded interior surfaces of the strip apart. In the form illustrated, the flat strip has portions 16 at its side edges of greater width than the wall thickness of the tubing (one-half the total thickness of the flat strip) and these portions form fins extending along opposite sides of the expanded tubing and the composite structure as shown in FIGS. 4 and 5.

Tubing in the form of a flat strip can be obtained commercially in any desired length and, as mentioned above, it may be made of various materials, including metals or alloys such as copper, aluminum, stainless steel or impervious plastic compounds such as polyethylene or the like, which can be expanded into tubular shape and thereafter formed into a composite structure of the desired configuration. The strip material must be ductile enough, so that it can be shaped in forming the final laminated product.

The forward end of the strip, as it advances, passes between a pair of guide rolls 17 which are spaced apart a distance approximately equal to the thickness of the strip and these rolls may be driven to rotate in the direction in which the strip is advancing.

In initiating operations, after leaving the guide rolls 17, the central fissure at the forward end of the strip 11 is opened sufficiently to permit introduction therein of a fluid under pressure and a length of the strip is then expanded into hollow or tubular shape so as to form a chamber to receive a supply of the core-forming material 12. As mentioned above, the core may be formed from various materials including plastics and metals. In the case of a thermoplastic material, such as polyethylene, the supply of core-forming material may be maintained in a soft, flowable condition by the application of heat thereto. In this connection, it should be noted that the core-forming material may in many instances be employed to expand the strip into tubular form.

The quantity of the core-forming material required and thus, the length of the strip which is expanded to form the chamber containing such material, can be determined from the configuration of the composite structure and the overall length of the strip of tubing. For example, where the composite structure has a core of plastic material which is approximately ⅛ of an inch in thickness and 15½ inches in width encased within a thin casing or sheath of an aluminum alloy which when in strip form is about 1000 feet long, the chamber to be filled with the plastic core-forming material will be cylindrical in shape and should initially be about 25 feet long.

After the expanded chamber has been formed, it is filled with a supply of core-forming material 12 and the tubing at the forward end of the chamber is then closed by crimping or the like. The closed end of the tubing is then passed between a pair of shaping dies in the form of rolls 18 which are driven so as to rotate in the direction in which the strip is advancing. The shaping rolls 18 are designed to impart a desired configuration to the composite structure and are spaced apart a distance greater than the overall thickness of the original flat strip. Thus, as the expanded length of the tubing 11 which contains the core-forming material 12 is advanced between the shaping rolls 18, it is progressively compressed and partially collapsed by the rolls with the cross-sectional area of the core-forming material confined therein being reduced.

In the illustrated embodiment of FIGS. 1–5, the shaping rolls 18 are cylindrical and compress the expanded tubing to a generally flat sheet having a layer of the core-forming material 12 enclosed therein, as shown in FIG. 5. However, it will be understood that the shaping rolls may be formed to impart other shapes to the composite structure and that the tubing or strip together with the core-forming material may be passed through several sets of shaping rolls to obtain the desired configuration without setting up excessive stresses. It will also be understood that instead of shaping rolls, die means of any other shape or form, as for example, die means in the shape of a fixed drawing die may be employed, to impart the desired configuration to the composite structure.

The reduction in the cross-sectional area of the core-forming material by the shaping rolls restricts the amount of the core-forming material which passes between the rolls with the outer casing or sheath and thus, as the tubing or strip continues to move forward, the supply of core-forming material remaining in the supply chamber continues to open and expand the flat strip at the opposite end of the chamber as the strip is moved relative thereto as a result of the shaping operation. In other words, the bulk of the supply of core-forming material remains in a fixed position ahead of the shaping rolls 18 and acts as a mandrel in expanding the flat, ribbon-like strip as the strip is advanced and moved relative to the supply of core-forming material confined in the supply chamber.

In general, the distance between the shaping rolls 18 and the guide rolls 17 will be set to correspond to the length of the strip which is to be expanded into tubular shape and filled with core material and the guide rolls are moved toward the shaping rolls as this length decreases in accordance with the consumption of the supply of core-forming material. If desired, the guide rolls 17 may be employed to apply pressure to the supply of core-forming material in the expanded length of the tubing so, as shown, as to insure that the core-forming material will be fed through the shaping rolls along with the tubing in a uniform manner and that no voids or the like will occur. Such pressure may be applied by forcing the guide rolls 17 toward the shaping rolls 18, thus compressing the mass of filler material 12 located between these sets of rolls. However, the necessity for this will depend to a large extent on the characteristics of the materials from which the strip and the core are made and in many instances the pressure required to expand the flat ribbon-like strip into tubular form will be sufficient to prevent voids and insure uniform distribution of the core-forming material. In any case, the core-forming material should be pressed against the field of action of the shaping rolls sufficiently to insure the filling of the flattened tube as it emerges from this field.

Any suitable mechanism may be used to advance the guide rolls 17 toward the shaping rolls 18 as the supply of core-forming material 12 is consumed. For example, the shafts on which the rolls are mounted may be supported in bearings which are slidable lengthwise relative to the strip 11 and rams 19 actuated by hydraulic cylinders 20 may be connected to the bearing. Also, if required, a series of supporting rolls 21 may be positioned beneath the expanded length of the tubing which contains the core-forming material 12. The individual support rolls 21 should be mounted so that they can be moved out of the path of the guide rolls 17, as indicated at A, as the guide rolls move forwardly when the length of the expanded strip decreases. Where the strip 11 is moved vertically, the support rolls may be eliminated.

Where the core-forming material 12 does not harden or set immediately and remains in fluid-like condition after leaving the shaping rolls 18, hydraulic pressure transmitted to the core 12 may cause bulging or other distortion of the composite structure and in order to maintain the desired configuration, a series of small shape-retaining rolls 22 may be provided on opposite sides of the composite structure as it leaves the shaping rolls. These rolls 22 will extend to a point where either the core-forming material 12 has set or hardened sufficiently, so that it will conform to the shape of the outer casing without causing distortion thereof or where the fluid pressure has been reduced, so that bulging of the outer casing will not longer take place.

Where the core-forming material 12 sets or hardens upon cooling as in the case of a thermoplastic material or a metal alloy, the setting or hardening process may be expedited by applying a cooling medium to the composite structure by means of spray heads 23 after it leaves the shaping rolls.

As noted above, when the core is formed of a material such as thermoplastic or a metal alloy which can be maintained in a fluid or flowable state by the application of heat, heat may also be applied to the strip by means of a heating element 24, such as a gas burner, before the strip 11 is expanded and heat may also be appled to the expanded portion of the strip containing the core-forming material by means of a heating element 25 so as to maintain the core-forming material at a desired temperature.

When a thermosetting material, such as phenolic or formaldehyde molding compounds, is employed as the core-forming material, heat may be applied to the composite structure by suitable means after it leaves the shaping rolls 18 so as to cause the thermosetting material to harden.

After the core-forming material has set or hardened, the composite structure is engaged by a set of feed rolls 26 which are driven so as to aid in pulling the strip and the core through the various operations described above at a substantially constant speed.

Following the feed rolls, the composite structure passes between a pair of cutting blades 27 which are operated periodically to sever a desired length of the composite structure from the forwardly advancing end thereof.

As mentioned above, a wide variety of material may be employed for the core. For example, the core 12 may be formed of plastic materials having glass filaments or fibers mixed therein so as to impart greater strength to the core. The core may also be formed of metal such as lead, aluminum alloys or the like. Powdered materials, such as powdered metal, may also be used for the core. In forming a core of powdered metal, the powdered material is compacted as it passes between the shaping rolls and is then heated to its sintering temperature. Where powdered materials are employed for the core, it may be desirable to vibrate the portion of the strip forming the chamber containing the powdered material and to move the strip vertically so as to avoid excessive shear stresses in effecting flow of the powdered material. Of course, the heating or cooling of both the strips 12 and its rate of travel as it is being processed will depend on the properties of the particular core-forming material being used and will be regulated accordingly.

In this connection, it should be noted that the outer casing and the core may be of the same composition and still come within the definition of a composite structure as used herein. An example of this would be where the core is formed from powdered metal of the same composition as the metal from which the strip is made.

FIG. 6 illustrates another embodiment of the invention, in which a preformed expanded tube 30 having, for example, a circular cross-section, and made of the same impervious ductile material as that of the tubular strip 11 in the method illustrated in FIGS. 1–5, is supported vertically and made to travel lengthwise downwardly through die means shown in the form of a pair of opposed cylindrical shaping rolls 31, serving to flatten out or otherwise shape and reduce the area of the cross-section of the tube. In operation, the core material 32, similar to the core material 12 described in connection with the method illustrated in FIGS. 1–5, is deposited in the expanded tube 30 and as the shaping rolls 31 are driven in the direction indicated, the tube containing the core material is flattened into the laminate 33, similar to that shown in FIG. 5, except that the laminate 33 does not have the ribs 16.

The weight of the core material 32 in the expanded tube 30 is sufficient to press the core material by the action of gravity towards the nip of the shaping rolls 31, thereby assuring complete filling of the tube at said nip and the uniform spread of the core material upwardly along the tube as the tube is extruded from between the shaping rolls.

The batch of core material 32 initially deposited into the expanded tube 30 may be sufficient to fill the full length of the flattened tube produced or the core material may be fed into the expanded tube progressively as the shaping takes place, providing there is enough core material in the expanded tube above the nip of the shaping rolls 31 during most of the shaping period to assure complete filling of the tube as it is flattened by said shaping rolls.

The operation illustrated in FIG. 6 may be carried out in conjunction with heaters as shown in FIG. 1, according to the character of the materials employed for the tube and for the core.

Figure 7:
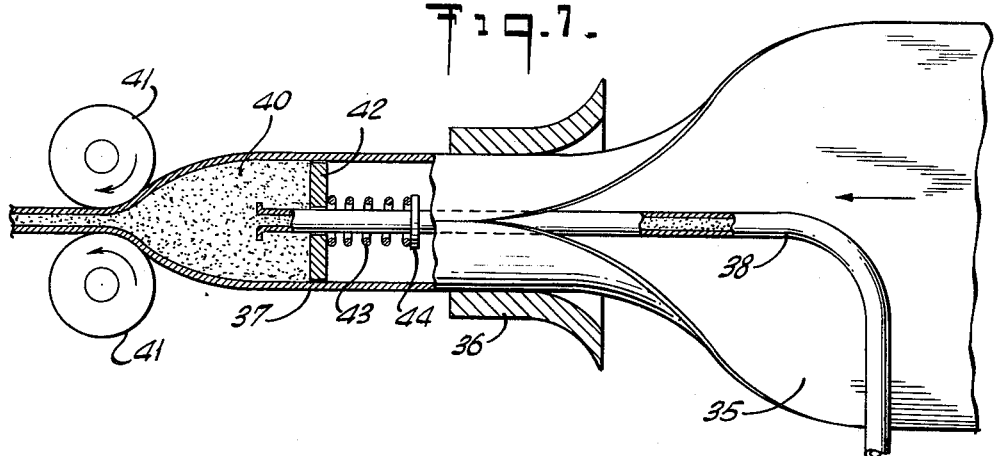
FIG. 7 shows in vertical section still another way of producing a composite structure in accordance with the present invention.

FIG. 7 shows a method in which the expanded tube may be formed continuously from ribbon stock, while the tube is being filled with core material and shaped. In accordance with the embodiment shown in FIG. 7, a flat strip 35 of impervious ductile material, similar to that from which the tube 11 in the method of FIGS. 1–5 is made, is shaped progressively into expanded tubular form by bringing the opposite longitudinal edges of the strips together and welding these edges together.

The flat strip 35 may be a skelp and may be processed in the well known manner to form a butt-welded tube. For that purpose, the longitudinal edges of the strip 35 may be slightly bevelled, so that when the strip is bent to form the tube, they will fit squarely and form a perfect joint.

The welding machine 36 is shown in the form of a welding die known as a welding bell, and is so flaringly shaped inside that as the strip 35 is pulled through it, the strip is gradually bent into the form of a tube, and its edges are forced together, thus forming the weld. The abutting edges may be welded or fused together. If the character of the material employed for the strip 35 and the core material is such as to withstand high temperature, the strip 35 may be heated in the furnace to the proper welding temperature, so that the edges will be welded together when combined.

As another alternative, the strip 35 may be cold as it is shaped by a die in the form of a fixed draw bench, or in the form of a series of progressively contoured shaping rolls, as is well known in the art, to bring the opposite edges together and the resulting longitudinal joint between the edges may be welded by high frequency resistance welding, inductive welding, Heli-arc welding or any other well known manner of welding to form the expanded tube.

The strip 35 processed as described, will form an expanded tube 37 of circular cross-section. Through the open accessible end of the tube 37 is inserted a feed pipe 38 for the core material 40, which may be similar to the core material 12 in the process illustrated in FIGS. 1–5. Beyond the welding machine 36 is the die means shown in the form of cylindrical shaping rolls 41 serving to flatten the filled tube 37 and form a laminate similar to that shown in FIG. 5, except for the absence of the ribs 16.

The feed pipe 38 delivers the core material 40 to a region near the nip of the shaping rolls 41 and where the process is carried out with the tube 37 travelling horizontally as shown, special means may be necessary to press the core material towards the nip of said shaping rolls as the core material is spread along the expanded tube. For that purpose, a circular pressure plate 42 may be provided in the expanded tube 37, large enough to have a free but snug slide fit in said tube and on the feed pipe 38. This plate 42 is yieldably pressed against the core material 40 by means of a spring 43 encircling the feed pipe 38 and bearing at one end against a collar 44 affixed to said feed pipe and at the other end against the plate.

When the expanded tube 37 travels vertically, no such pressure plate as shown in FIG. 7 is required, the gravity action of the core material 40 itself being sufficient to create enough pressure to insure filling of the tube, as in the process illustrated in FIG. 6.

As another alternative, the tube forming the outer casing for the laminate may be formed from two similar ribbon strips, which are brought progressively together with their faces confronting and which are progressively welded together along their abutting edges to form a tube; the tube so formed may be expanded in any suitable manner, as for example, by air pressure, and the core material is then fed into the interior of the expanded tube. The filled expanded tube so formed can then be formed into a laminate similar to that shown in FIG. 5, with or without the ribs 16, depending on the comparative width of the welded edges of the tube.

The ultimate laminate formed by the processes described may be in the form shown in FIG. 5 with or without the ribs 16, or may take any other form according to the use to which the laminate is to be put. For example, the laminate shown in FIG. 5 with or without the ribs 16 can be bent into circular shape with the longitudinal edges brought into abutting relationship, and these abutting edges may be welded together to form a tube with a laminated wall comprising inner and outer layers separated by the core material.

The laminate described has the advantage of forming an integrated unit in which the core material is entirely and snugly enclosed by the casing or skin, so that no problem of bonding is posed. The laminate can be constructed to serve as a structural element having a load-bearing skin of high yield strength and a lighter core. This laminate so constructed can be bent and its high strength at low specific gravity makes it highly useful in lightweight application, as in airborne and shipboard paneling, small boats, automotive body parts and in building trades for structural and decorative paneling for interior or exterior use. The laminate can also be employed for heat insulation.

While the invention has been described with particular reference to specific embodiments, it is to be understood

What is claimed is:

1. A method of forming a laminate which comprises providing an expanded impervious ductile tube of form sustaining rigidity filled along only a part of its length with a deformable mass of core material, different from that of the tube, and passing the filled section of the expanded tube through a die means to shape and collapse the filled tube to an extent sufficient to form a laminate comprising a core and a casing therefor, while reducing the cross-sectional area of the filled tube, thereby causing said core material to be squeezed by said die means and consequently to be spread rearwardly of said field of action along the expanded unfilled tube.

2. A method of forming a laminate as described in claim 1, wherein said shaping and collapsing step is carried out without substantially altering the thickness of the walls of said tube.

3. A method as described in claim 1, wherein said tube is of metal and said core material is a plastic.

4. A method as described in claim 1, wherein said tube is of plastic material.

5. A method as described in claim 1, wherein said core material is a powdered metal.

6. A method as described in claim 1, wherein said core material is a powdered sinterable metal.

7. A method as described in claim 1, wherein said die means is in the form of a pair of opposed substantially cylindrical rolls adapted to shape the filled tube into flattened condition, and spaced to form a laminate having opposed casing walls spaced and separated by the intervening core material.

8. A method as described in claim 1, comprising the step of pressing the core material forwardly towards the field of action of said die means during the shaping and collapsing operation against the spreading action of said die means.

9. A method of forming a laminate which comprises feeding a flat strip of ductile tubing of form sustaining rigidity forwardly towards a shaping field while a section of this tubing rearwardly of said shaping field is expanded and filled with a deformable mass of core material different from that of said tubing, holding the rear end of said section of said tubing against expansion due to the spreading action of the core material while said expanded tubing section is passing through said shaping field, shaping and collapsing the expanded filled section of the tubing at said shaping field as it passes through said field to an extent sufficient to form a laminate comprising a core and a casing therefor, while reducing its cross-sectional area, to cause the core material to spread along said tubing rearwardly of said shaping field, and reducing the length of said expanded section progressively as said shaping and collapsing operations continue, until substantially all of the core material has been spread out to form the laminate.

10. A method as described in claim 1, wherein said expanded tube is supported vertically while moving downwardly through said die means, whereby the core material is pressed downwardly by the action of gravity towards the field of action of said die means.

11. A method as described in claim 1, wherein said tube is in collapsed state at a section rearwardly of said core material to maintain said core material under confinement, as said material is spread rearwardly from the field of action of said die means.

12. A method as described in claim 1, wherein said tube is preformed along its entire length before being shaped.

13. A method as described in claim 1, which comprises forming said expanded tube from a ribbon continuously while said expanded tube filled with said core material is being shaped and collapsed.

14. A method as described in claim 1, which comprises bending a ribbon strip into tubular shape and welding it continuously to form said expanded tube, while said expanded tube filled with said core material is being shaped and collapsed.

References Cited by the Examiner

UNITED STATES PATENTS

| | | | |
|---|---|---|---|
| 2,414,226 | 1/1947 | Everett | 264—266 X |
| 2,888,740 | 6/1959 | Danis | 29—420.5 X |
| 3,040,417 | 6/1962 | Newton | 29—422 X |
| 3,084,397 | 4/1963 | Diemer et al. | 264—175 X |
| 3,141,227 | 7/1964 | Klepfer et al. | 29—473.3 X |
| 3,142,560 | 7/1964 | Storchheim | 29—420.5 X |
| 3,158,474 | 11/1964 | Andersen et al. | 264—111 X |

WHITMORE A. WILTZ, *Primary Examiner.*